(12) United States Patent
Lie et al.

(10) Patent No.: US 10,379,246 B2
(45) Date of Patent: Aug. 13, 2019

(54) DYNAMIC GAIN SYSTEM WITH AZIMUTHAL AVERAGING FOR DOWNHOLE LOGGING TOOLS

(71) Applicant: Halliburton Energy Services, Inc., Houston, TX (US)

(72) Inventors: Joni Polili Lie, Singapore (SG); Batakrishna Mandal, Missouri City, TX (US); Peng Li, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 220 days.

(21) Appl. No.: 15/314,593

(22) PCT Filed: Apr. 28, 2016

(86) PCT No.: PCT/US2016/029742
§ 371 (c)(1),
(2) Date: Nov. 29, 2016

(87) PCT Pub. No.: WO2016/191027
PCT Pub. Date: Dec. 1, 2016

(65) Prior Publication Data
US 2017/0184750 A1    Jun. 29, 2017

Related U.S. Application Data

(60) Provisional application No. 62/165,641, filed on May 22, 2015.

(51) Int. Cl.
*G01V 1/00*    (2006.01)
*G01V 1/46*    (2006.01)
*G01V 1/44*    (2006.01)

(52) U.S. Cl.
CPC . *G01V 1/46* (2013.01); *G01V 1/44* (2013.01)

(58) Field of Classification Search
CPC ........................................................ G01V 1/46
See application file for complete search history.

(56) References Cited

U.S. PATENT DOCUMENTS 4,727,521 A * 2/1988 Meyer .................... G01V 1/245
                                                          367/65
4,802,145 A    1/1989 Mount, II
(Continued)

FOREIGN PATENT DOCUMENTS

EP           1275983 A2    1/2003

OTHER PUBLICATIONS

"Factor Ratio Gain conversion to Level in Decibels dB field quantity power" www.sengpielaudio.com/calculator-factor-ratioleveldecibel.htm, Jan. 18, 2013 (Year: 2013).*
(Continued)

*Primary Examiner* — Krystine E Breier
(74) *Attorney, Agent, or Firm* — Benjamin Fite; Baker Botts L.L.P.

(57) ABSTRACT

An example method may include transmitting a first acoustic signal from a downhole tool using a transmitter gain in a transmitter circuit. A first echo signal associated with the first acoustic signal may be received at the downhole tool using a receiver gain in a receiver circuit. At least one of the transmitter gain and the receiver gain may be adjusted based, at least in part, on the received first echo signal and at least one previously received echo signal.

20 Claims, 5 Drawing Sheets

(56) References Cited

U.S. PATENT DOCUMENTS

| | | | | |
|---|---|---|---|---|
| 4,999,817 A * | 3/1991 | Zimmer | ............... | G01V 1/245 |
| | | | | 367/65 |
| 5,648,613 A * | 7/1997 | Kiefer | ............... | G01N 29/0672 |
| | | | | 73/609 |
| 5,796,677 A * | 8/1998 | Kostek | ............... | G01V 1/48 |
| | | | | 367/25 |
| 5,924,499 A | 7/1999 | Birchak et al. | | |
| 6,018,496 A | 1/2000 | Stanke et al. | | |
| 6,618,322 B1 * | 9/2003 | Georgi | ............... | E21B 47/082 |
| | | | | 367/27 |
| 9,103,196 B2 * | 8/2015 | Zhao | ............... | E21B 47/082 |
| 9,772,424 B2 * | 9/2017 | Cao | ............... | G01V 3/20 |
| 2006/0133205 A1 | 6/2006 | Van Kuijk et al. | | |
| 2013/0030708 A1* | 1/2013 | Forgang | ............... | G01V 3/24 |
| | | | | 702/11 |

OTHER PUBLICATIONS

International Search Report and Written Opinion issued in related PCT Application No. PCT/US2016/029742 dated Aug. 9, 2016, 14 pages.

International Preliminary Report on Patentability issued in related PCT Application No. PCT/US2016/029742, dated Dec. 7, 2017, 11 pages.

* cited by examiner

DYNAMIC GAIN SYSTEM WITH AZIMUTHAL AVERAGING FOR DOWNHOLE LOGGING TOOLS

CROSS-REFERENCE TO RELATED APPLICATION

The present application is a U.S. National Stage Application of International Application No. PCT/US2016/029742 filed Apr. 28, 2016, which claims benefit of U.S. Provisional Application No. 62/165,641 filed May 22, 2015, both of which are incorporated herein by reference in their entirety for all purposes.

The present disclosure relates generally to well drilling and completion operations and, more particularly, to a dynamic gain system with azimuthal averaging for downhole logging tools.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. Well drilling and completion operations require information on downhole characteristics to aide in decision making processes. That information may be provided by measurement and logging tools positioned within the wellbore. Typical acoustic logging tools operate by sending an acoustic pulse into the wellbore and receiving an echo after the acoustic pulse is reflected by casing or pipe in the cased-hole application and by the wellbore wall in the open-hole application. The waveform of the echo can then be used to calculated or otherwise deduce physical properties of the casing/pipe or borehole wall (such as the impedance, thickness, slowness, reflectance etc.).

The transmitted acoustic pulses may be subject to attenuation that is a function of the operating condition of the acoustic logging tools (casing thickness, mud weight, borehole size, borehole wall rugosity, etc.). If the pulse is attenuated too much, the echo signal may have insufficient amplitude to provide reliable signal quality. If the pulse is not attenuated enough, the echo signal may saturate the receiver, which also leads to poor signal quality. Because the operating conditions may change over time, maintaining proper gain adjustments in the tool may be important to ensuring sufficient signal quality and accurate calculations regarding the physical properties.

FIGURES

Some specific exemplary embodiments of the disclosure may be understood by referring, in part, to the following description and the accompanying drawings.

Figure 1:
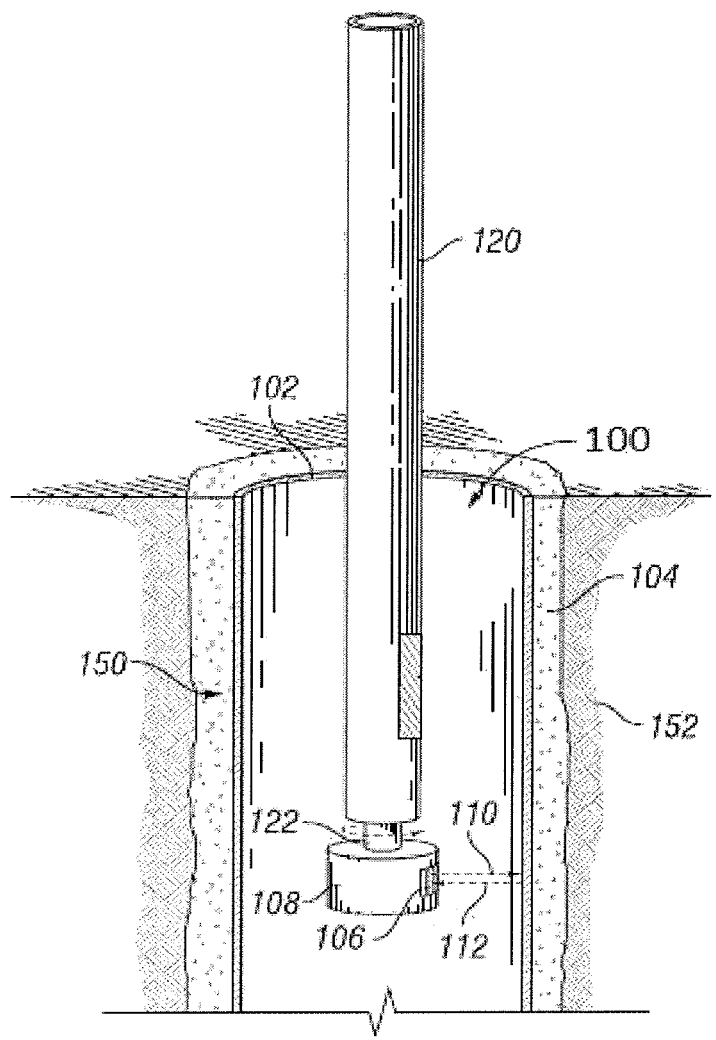
FIG. 1 is a diagram illustrating an example acoustic logging tool, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling and completion operations and, more particularly, to a dynamic gain system with azimuthal averaging for downhole logging tools.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot/tractor or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"), and wireline. In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

FIG. 1 is a diagram illustrating an example acoustic logging tool 100, according to aspects of the present disclosure. The tool 100 may be suspended (e.g. via wireline, slickline, coiled tubing, drill pipe/tubing, downhole tractor, or the like) within a wellbore 150 in a subterranean formation 152. As depicted, the tool 100 may be positioned within a casing 102 that is secured in the wellbore 150 by a cement layer 104 that substantially fills the annulus between the casing 102 and the wellbore 150. The casing 102 may comprise a metal tubular with a pre-determined length and diameter that is specifically selected for a particular depth in the formation 152. Although only one casing 102 is shown in FIG. 1, multiple casings may be used, including in a telescopic orientation where casings with progressively smaller diameters are used as the wellbore 150 extends further into the formation 152. The casing 112 may prevent the wellbore 150 from collapsing, prevent sensitive formation strata from exposure to downhole fluids, and prevent unwanted formation fluids from entering the wellbore 150. This embodiment is referred to a "cased" hole. The tool may also be positioned within an "open" hole, which may comprise the wellbore 150 without the casing 102 or the cement layer 104.

The tool 100 comprises an elongated tool body 120 comprising a rotating portion 108 with a single acoustic transducer 106 coupled thereto. Example acoustic transducers include, but are not limited to, piezoelectric crystals, geophones, electromagnetic elements, etc. As depicted, the rotating portion 108 comprises a rotating head positioned at a distal end of the elongated tool body 120. In other embodiments, the rotation portion 108 may be positioned at one or more intermediate portions of the elongated tool body 120, which may provide greater flexibility with respect to the tool design. As depicted, the diameter of the rotating portion 108 is larger than the diameter of the elongated tool body 120, but other configurations are possible within the scope of the present disclosure.

The rotating portion 108 may be driven by an electric motor (not shown) or another suitable drive mechanism that provides for the controlled rotational movement of the rotating portion 108 with respect to the tool 100. As depicted, the rotating portions 108 may be driven through a shaft connecting the rotating portion 108 to a drive mechanism within the elongated tool body 120. Power for the drive mechanism and other elements within the tool 100 may be provided, for instance, through the means of suspension, or by one or more power sources, e.g., batteries, capacitors, generators, within the tool 100.

In use, the transducer 106 may transmit a directional acoustic pulse 110 to the casing 102 at a first azimuthal location with respect to the tool 100. The directional acoustic pulse 110 may be characterized by a peak amplitude. The directional acoustic pulse 110 is not limited with respect to frequency and can but is not required to be an ultrasonic pulse. The pulse 110 may contact, be reflected by, and/or cause to reverberate the casing 102, the cement layer 104, and the interface between the casing 102 and the cement layer 104. These reflections and reverberations may comprise an echo signal 112 that is received by the transducer 106. The echo signal 112 also may be characterized by a peak amplitude, with the difference between the peak amplitude of the echo signal 112 and the peak amplitude of the directional acoustic pulse 110 corresponding to an attenuation of the directional acoustic pulse 110. In certain instances, one or more pulses may also contact, be reflected by, and/or cause to reverberate the formation 152 and the interface between the cement layer 104 and the formation 152.

After the echo signal 112 is received from the first azimuthal location, the head 108 may be rotated to a second azimuthal location within the wellbore 150. Another pulse may then be transmitted from the transducer 106, and a corresponding echo signal may be received at the transducer 106. The head 108 then may be rotated to a third azimuthal location within the wellbore 150 and yet another pulse may then be transmitted from the transducer 106, and a corresponding echo signal may be received at the transducer 106. The first, second and third azimuthal locations may but are not required to be equal rotational intervals with respect to the tool 100. For instance, the angular difference between the azimuthal locations may be modified in real time depending on the signals received and the granularity of the resulting measurements, with smaller rotational intervals corresponding to a higher granularity.

In certain embodiments, this process may continue until the head 108 has completed a rotation, at which point the tool 300 may be positioned at a different depth. The group of azimuthal measurements taken at a particular depth may be referred to as a "scan." The number of azimuthal measurements taken to complete a scan may depend, for instance, on the granularity required by the combined measurements as well as downhole conditions. Although not shown, instead of a rotating head, the whole tool 100 or a portion thereof having the transducer 106 can be rotated to accomplish a similar azimuthal scan. For example, if the tool 100 is conveyed into the wellbore 150 via drill pipe, the drill pipe could be rotated to in-turn rotate the tool 100 and thereby the transducer 106.

In certain embodiments, each echo signal received by the transducer 106 may be transmitted to one or more control systems (not shown) associated with the tool 100, where it can be processed, for example, for the purposes of controlling or altering the configuration of the tool 100 or elements of the tool 100, or for the purpose of determining physical characteristics (e.g., impedance, thickness, slowness, reflectance) of the casing 102 and cement layer 104. As used herein a control system may comprise an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data. The one or more control systems associated with the tool 100 could be, for example, wholly within the tool 100, located at the surface, or a combination of the two (e.g. some processing occurring downhole and some done at the surface.

Attenuation conditions with the wellbore 150 may affect the signal quality of the echo signal. Those conditions may be a function of the operating condition of the tools. For instance, the thickness of the casing 102, the size and shape of the borehole within the formation 152, the fluid characteristics of drilling mud or other fluids within the casing 102, etc. can all affect the peak amplitude of the echo 112. If the pulse 110 is attenuated too much, the echo signal 112 may have insufficient amplitude to provide reliable signal quality. In contrast, if the pulse 110 is not attenuated enough, the echo signal 112 may saturate the receiver, which also leads to poor signal quantity. Notably, the attenuation conditions may change with respect to azimuthal positions around the tool 100 and also with respect to the depth at which the tool 100 is positioned within the wellbore 152.

Figure 2:
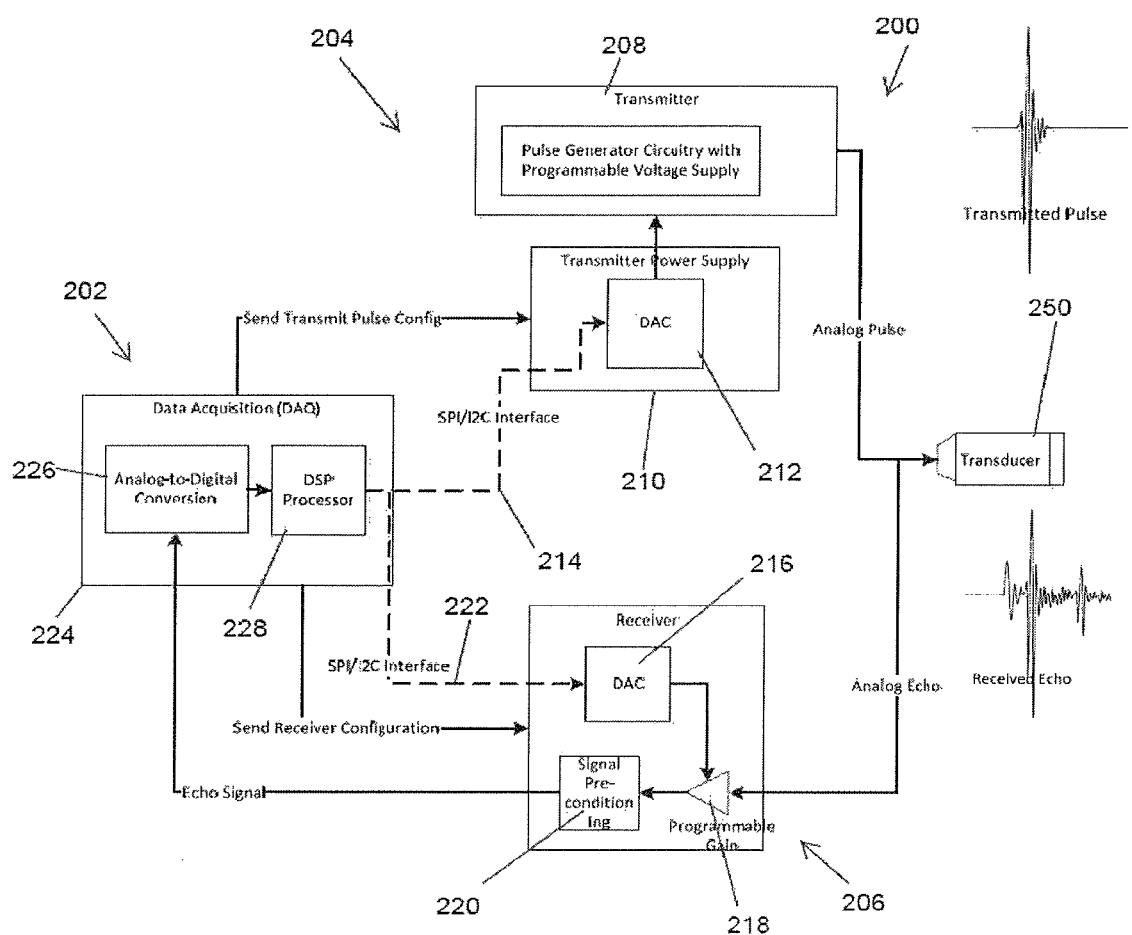
FIG. 2 is a block diagram of an example firing system for an acoustic logging tool, according to aspects of the present disclosure.

According to aspects of the present disclosure, gain adjustments with respect to both the transmitted acoustic pulse 110 and the received echo signal 112 may be made to adjust for dynamic attenuation conditions and improve the resulting measurements. These gain adjustments can, but are not required to, be made in a control system of the tool 110, which may comprise a firing system responsible for the transmission and reception of signals with respect to the tool 100. FIG. 2 is a block diagram of an example firing system 200 for an acoustic logging tool, according to aspects of the present disclosure. The system 200 comprises a firing controller 202 coupled to transmitter circuitry 204 and receiver circuitry 206, both of which are coupled to a transducer 250. The firing controller 202 may comprise a control unit located within the logging tool, at the surface, or a combination of the two. The transducer 250 may comprise a transceiver or an independent transmitter and an independent receiver.

As depicted, the transmitter circuitry 204 comprises a transmitter 208 with pulse generator circuitry and a programmable voltage supply, that outputs voltage pulses to the transducer 250 to cause it to generate desired acoustic pulses with peak amplitudes that corresponds to the peak amplitudes of the voltage pulses. The transmitter circuitry 204 further includes a power supply 210 that may receive one or more control signals from the firing controller 202 that cause it to alter the power supplied to the transmitter 208. In particular, a digital-to-analog converter (DAC) 212 of the power supply 210 may receive the control signal from the firing controller 202 over a dedicated communication channel 214, such as a Inter Integrated Circuit Communications (I2C) channel or a Serial-Peripheral Interface (SPI). The control signal received at the power supply 210 from the firing controller 202 may comprise a gain adjustment signal that causes the amplitude of the voltage pulses and therefore the amplitude of the acoustic pulses generated by the transducer 250 to change. Other configurations are possible within the scope of this disclosure.

As depicted, the receiver circuitry 206 comprises a DAC 216, a programmable gain amplifier 218, and a signal conditioning block 220. Like the DAC 212 of the transmitter circuitry 204, the DAC 216 of the receiver circuitry 206 may receive gain adjustment signals from the firing controller 202 over a dedicated I2C/SPI channel 222. In response to the gain adjustment signal, the DAC 216 may output a signal to the programmable amplifier 218 that alters the gain applied to an echo signal received through the transducer 250, effectively changing the peak amplitude of the each signal received at the tool. The signal conditioning block 220 may filter the amplified echo signal before transmitting the echo signal to the firing controller 202. Other configurations are possible within the scope of this disclosure.

In one or more embodiments, the firing controller 202 comprises a data acquisition (DAQ) system 224 that manages both data acquisition and processing functionalities to control the gain within the firing system 200. In particular, during data acquisition, an analog-to-digital converter (ADC) 226 may receive an echo signal and sample the signal. This may act to update the receiver gain adjustment for the current echo signal acquisition. After the sampled data is acquired, a digital signal processor (DSP) 228 of the DAQ 224 may calculate the echo arrival time and peak amplitude level with respect to the transmitted pulses. This information may then be used to adjust generate gain adjustment signals for at least one of the transmitter circuitry 204 and the receiver circuitry 206.

In one or more embodiments, the gain adjustment signals may be based, at least in part, on the following gain adjustment equation:

$$G_r(n) = \begin{cases} G_r(n-1), & 0.9 A_{opt} < G_r(n-1) < 1.1 A_{opt} \\ G_r(n-1) + \mu_r \log\left(\dfrac{A_{opt}}{\sum_{k=1}^{M} \alpha_r(n-k)}\right), & \text{otherwise} \end{cases}$$

where $G_r(n)$ corresponds to the receiver gain for the n-th acquisition, $A_{opt}$ corresponds to the optimal ADC level, $\alpha_r(n)$ corresponds to the echo amplitude calculated for the n-th acquisition; M corresponds to a predetermined number of previous echo signal acquisitions; and $\mu_r$ comprises a constant step size that defines a convergence rate of the adjustment. Accordingly, the gain adjustment signal may account for at least one previously captured echo signal at the tool. By accounting for a range of acquired echo signals, the firing system 200 may maximize the dynamic range of the ADC when sampling the echo signal, neglect minor change in the receiver gain within the same azimuth acquisition, detect and prevent saturation at the ADC that results in loss of data, and protect against intermittent acquisition errors.

Figure 3:
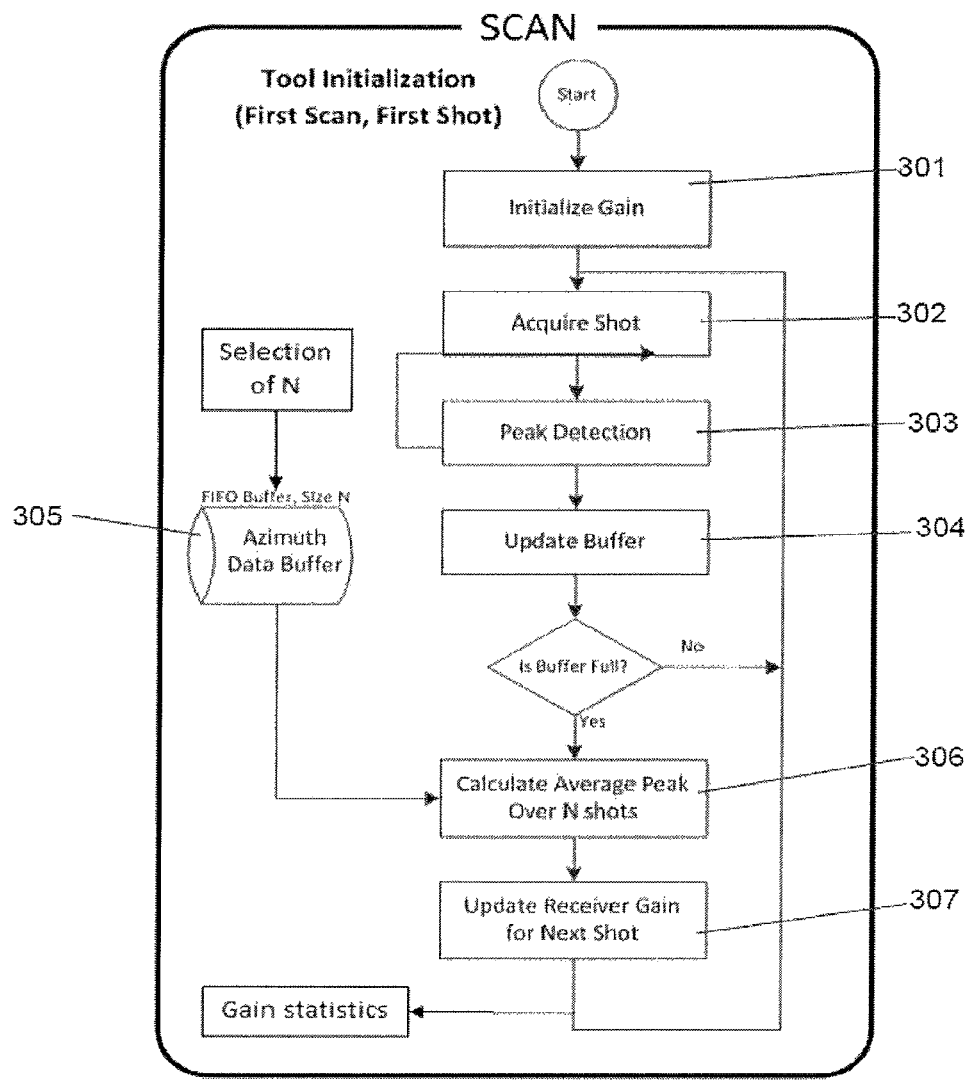
FIG. 3 is an example process for altering the gain at the receiver, according to aspects of the present disclosure.

FIG. 3 is an example process for altering the gain at the receiver, according to aspects of the present disclosure. In one or more embodiments, the process described with respect to FIG. 3 may be implemented in the DSP of the tool described above with respect to FIG. 2, or in any other suitable control system. Step 301 comprises setting the receiver gain at a first value, which may be based, for example on a initialization value or some experimentally acquired value. Step 302 comprises acquiring an individual "shot" which may include transmitting an acoustic pulse from a transducer and receiving a corresponding echo signal, as described above. Step 303 comprises determining a peak amplitude of the received echo signal. Step 304 comprises storing the peak amplitude in a data buffer 305. Step 301-304 may be repeated until the buffer 305 is full or has reached a minimum capacity M necessary to perform to use a gain adjustment equation similar to the one described above.

At step 306, once the buffer 305 is full or has reached a minimum capacity M, the average peak over the previous M shots may be determined. At step 307, once the average peak value is determined, the value may be used in a gain adjustment equation, for example, to adjust the gain at the receiver circuitry prior to the next shot. For each subsequent shot, the oldest stored value within the buffer 305 may be pushed out and the average peak value recalculated. Accordingly, the gain may be adjusted after each shot based on a running window of results for the previous M shots. Notably, the value of M may be adjusted based on the operating conditions of the logging tool, including the potential shot-to-shot variability.

Figure 4:
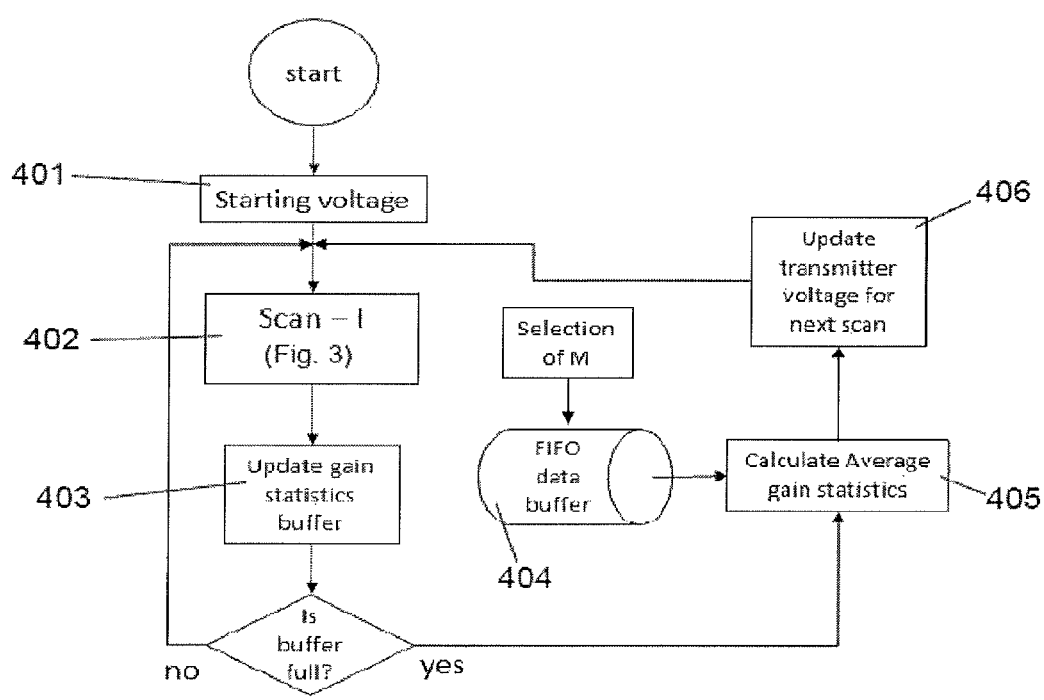
FIG. 4 is an example process for altering the gain at the receiver, according to aspects of the present disclosure.

FIG. 4 is an example process for altering the gain at the transmitter, according to aspects of the present disclosure. Like the process described with respect to FIG. 3, the process described with respect to FIG. 4 also may be implemented in the DSP of the tool described above with respect to FIG. 2, or in any other suitable control system. At step 401, the transmitter gain may be set at a first value. At step 402, a first scan may be completed. As described above, a scan may comprise a series of azimuthal shots at a particular depth. After the scan is completed, the gain information for the scan may be stored at step 403 within the buffer 404. The gain information may include, for example, average gain information with respect to all shots taken during that scan. Steps 401-403 may be repeated with subsequent scans until the buffer contains at least M entries, which may correspond to the averaging window of a corresponding gain adjustment equation. At step 405, once the buffer contains at least M entries, the gain information for M entries in the buffer 403 may be retrieved and an average gain figure may be calculated. Based, at least in part, on that average gain information and a gain adjustment algorithm, the gain at the transmitter may be updated for the transmitter at step 406. For each subsequent scan, the oldest stored value within the buffer 404 may be pushed out and the average peak value recalculated. Accordingly, the gain may be adjusted after each scan based on a running window of results for the previous M scans. Notably, the value of M may be adjusted based on the operating conditions of the logging tool, including the potential shot-to-shot variability.

Although the gain for both the transmitter and receiver circuitry can be adjusted between every shot, it is preferred that the transmitter circuitry gain be adjusted only between scans rather than between individual shots. This is because adjusting the transmitter circuitry gain within a scan may skew the resulting echo signals such that characteristics at the scan depth can no longer be accurately determined.

Figure 5:
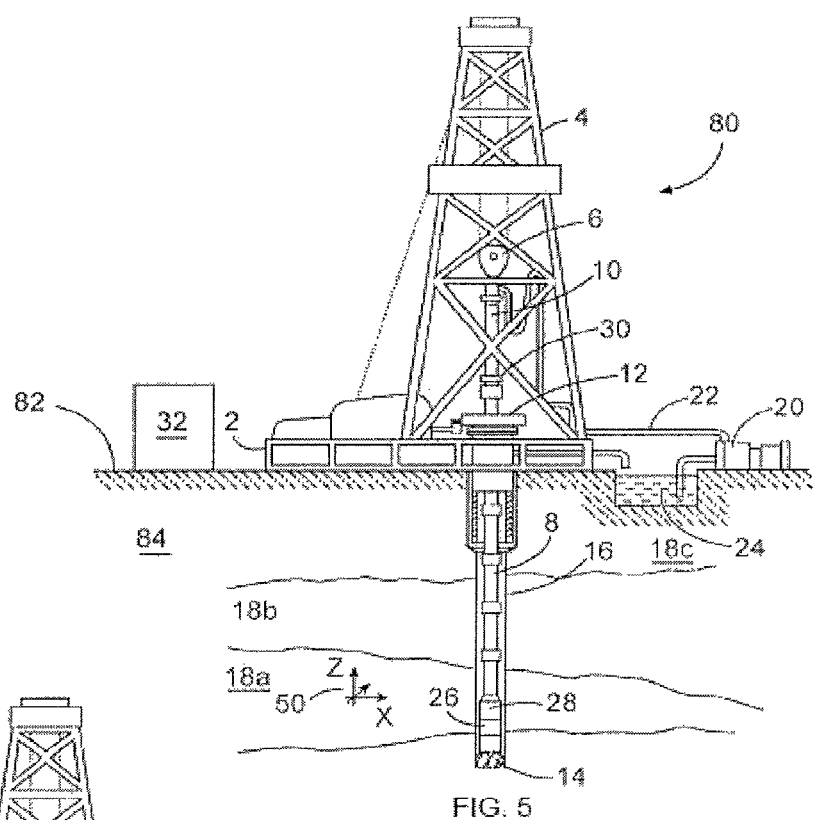
FIG. 5 is a diagram showing an illustrative drilling system, according to aspects of the present disclosure.

One or more of the apparatus, systems, and/or methods described above may be incorporated into/with a wireline tool/sonde for wireline logging operation or into/with one or more LWD/MWD tools for drilling operations. FIG. 5 is a diagram showing a subterranean drilling system 80 incorporating at least one acoustic LWD/MWD tool 26, according to aspects of the present disclosure. The drilling system 80 comprises a drilling platform 2 positioned at the surface 82. As depicted, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the acoustic tool 26. In one or more embodiments, the tool 26 may comprise acoustic pulse excitation and echo/reflection reception functionality that will be described in detail below. As the bit extends the borehole 16 through the formations 18, the tool 26 may collect measurements relating to borehole 16 and the formation 84. In certain embodiments, the orientation and position of the acoustic tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from acoustic tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may comprise an information handling system communicably coupled to the surface receiver 30 and may receive measurements from the acoustic tool 26 and/or transmit commands to the acoustic tool 26 though the surface receiver 30. The surface control unit 32 may also receive measurements from the acoustic tool 26 when the acoustic tool 26 is retrieved at the surface 102. As is described above, the surface control unit 32 may process some or all of the measurements from the acoustic tool 26 to determine certain parameters of downhole elements, including the borehole 16 and formation 84.

Figure 6:
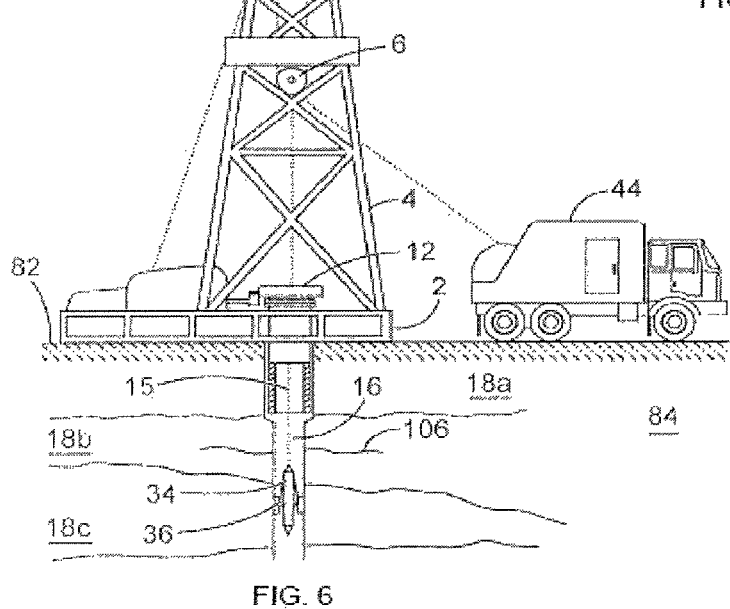
FIG. 6 is a diagram showing an illustrative wireline logging system, according to aspects of the present disclosure.

At various times during the drilling process, the drill string 8 may be removed from the borehole 16 as shown in FIG. 6. Once the drill string 8 has been removed, measurement/logging operations can be conducted using a wireline tool 34, e.g., an instrument that is suspended into the borehole 16 by a cable 15 having conductors for transporting power to the tool and telemetry from the tool body to the surface 102. The wireline tool 34 may comprise an acoustic tool 36, similar to the acoustic tool 26 described above. The tool 36 may be communicatively coupled to the cable 15. A logging facility 44 (shown in FIG. 5 as a truck, although it may be any other structure) may collect measurements from the acoustic tool 36, and may include computing facilities (including, e.g., a control unit/information handling system) for controlling, processing, storing, and/or visualizing some or all of the measurements gathered by the tool 36. The computing facilities may be communicatively coupled to the acoustic tool 36 by way of the cable 15. In certain embodiments, the control unit 32 may serve as the computing facilities of the logging facility 44.

An example method may include transmitting a first acoustic signal from a downhole tool using a transmitter gain in a transmitter circuit. A first echo signal associated with the first acoustic signal may be received at the downhole tool using a receiver gain in a receiver circuit. At least one of the transmitter gain and the receiver gain may be adjusted based, at least in part, on the received first echo signal and at least one previously received echo signal.

In one or more embodiments described in the preceding paragraph, transmitting the first acoustic signal from the downhole tool using the first transmitter gain in the transmitter circuit comprises transmitting the first acoustic signal from a transducer coupled to the transmitter circuit.

In one or more embodiments described in the preceding two paragraphs, receiving the echo signal associated with the first acoustic signal using the first receiver gain in the receiver circuit comprises receiving the echo signal from the transducer, wherein the transducer is coupled to the receiver circuit.

In one or more embodiments described in the preceding three paragraphs, the transducer is coupled to a rotating portion of the downhole tool.

In one or more embodiments described in the preceding four paragraphs, the rotating portion comprises a rotating head positioned at a distal end of the downhole tool.

In one or more embodiments described in the preceding five paragraphs, a second acoustic signal may be transmitted from the downhole tool and a second echo signal associated with the second acoustic signal may be received at the tool using at least one of the adjusted transmitter gain and the adjusted receiver gain.

In one or more embodiments described in the preceding six paragraphs, transmitting the second acoustic signal from the downhole tool comprises transmitting the second acoustic signal at the same depth but a different azimuthal orientation that the first acoustic signal; and receiving at the downhole tool the second echo signal comprises receiving the second echo signal using the adjusted receiver gain.

In one or more embodiments described in the preceding seven paragraphs, transmitting the second acoustic signal from the downhole tool comprises transmitting the second acoustic signal at a different depth but a different azimuthal orientation that the first acoustic signal using the adjusted transmitter gain.

In one or more embodiments described in the preceding eight paragraphs, adjusting the receiver gain based, at least in part, on the received first echo signal and at least one previously received echo signal comprises adjusting the receiver gain using the following equation $$G_r(n) = \begin{cases} G_r(n-1), & 0.9A_{opt} < G_r(n-1) < 1.1A_{opt} \\ G_r(n-1) + \mu_r \log\left(\dfrac{A_{opt}}{\sum_{k=1}^{M} \alpha_r(n-k)}\right), & \text{otherwise} \end{cases}$$

where $G_r(n)$ corresponds to a receiver gain associated with an n-th previously received echo signal, $A_{opt}$ corresponds to an optimal level associated with an analog-to-digital converter of the tool, $\alpha_r(n)$ corresponds to an echo amplitude calculated for the n-th previously received echo signal; M corresponds to a predetermined number of previous received echo signals; $\mu_r$ comprises a constant step size that defines a convergence rate of an adjustment.

In one or more embodiments described in the preceding nine paragraphs, M depends, at least in part, on one or more downhole conditions associated with the downhole tool.

An example system may include a downhole tool and a transducer coupled to the downhole tool. A transmitted circuit may be coupled to the transducer and characterized by a transmitter gain. A receiver circuit may be coupled to the transducer and characterized by a receiver gain. A controller may be communicably coupled to the transmitter circuit and the receiver circuit and configured to cause the transmitter circuit to transmit a first acoustic signal from the transducer using the transmitter gain; cause the receiver circuit to receive from the transducer a first echo signal associated with the first acoustic signal using the receiver gain; and adjust at least one of the transmitter gain and the receiver gain based, at least in part, on the received first echo signal and at least one previously received echo signal.

In one or more embodiments described in the preceding paragraph, the downhole tool comprises a rotating portion to which the transducer is coupled.

In one or more embodiments described in the preceding two paragraphs, the rotating portion comprises a rotating head positioned at a distal end of the downhole tool.

In one or more embodiments described in the preceding three paragraphs, the transducer comprises at least one of a piezoelectric element, a geophone, and an electromagnetic element.

In one or more embodiments described in the preceding four paragraphs, the downhole tool comprises one of a wireline tool and a logging-while-drilling tool.

In one or more embodiments described in the preceding five paragraphs, the controller is further configured to cause the transmitter circuit to transmit a second acoustic signal and the receiver circuit to receive a second echo signal associated with the second acoustic signal using at least one of the adjusted transmitter gain and the adjusted receiver gain.

In one or more embodiments described in the preceding six paragraphs the downhole tool comprises a rotating portion to which the transducer is coupled; and the controller is further configured to cause rotating portion of the downhole tool to alter the azimuthal orientation of the transducer before the second acoustic signal is transmitted; and cause the receiver circuit to receive the second echo signal using the adjusted receiver gain.

In one or more embodiments described in the preceding seven paragraphs, the controller is further configured to adjust the transmitter gain between depth changes of the downhole tool in a borehole.

In one or more embodiments described in the preceding eight paragraphs, the controller is further configured to adjust the receiver gain using the following equation $$G_r(n) = \begin{cases} G_r(n-1), & 0.9A_{opt} < G_r(n-1) < 1.1A_{opt} \\ G_r(n-1) + \mu_r \log\left(\dfrac{A_{opt}}{\sum_{k=1}^{M} \alpha_r(n-k)}\right), & \text{otherwise} \end{cases}$$

where $G_r(n)$ corresponds to a receiver gain associated with an n-th previously received echo signal, $A_{opt}$ corresponds to an optimal level associated with an analog-to-digital converter of the tool, $\alpha_r(n)$ corresponds to an echo amplitude calculated for the n-th previously received echo signal; M corresponds to a predetermined number of previous received echo signals; and $\mu_r$ comprises a constant step size that defines a convergence rate of an adjustment.

In one or more embodiments described in the preceding nine paragraphs, M depends, at least in part, on one or more downhole conditions associated with the downhole tool.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method, comprising:
   transmitting a first acoustic signal from a downhole tool using a transmitter gain in a transmitter circuit;
   receiving at the downhole tool a first echo signal associated with the first acoustic signal using a receiver gain in a receiver circuit;
   adjusting the transmitter gain, at least in part, on the received first echo signal and at least one previously received echo signal; and
   adjusting the receiver gain based, at least in part, on an optimal level associated with an analog-to-digital convertor of the tool.

2. The method of claim 1, wherein transmitting the first acoustic signal from the downhole tool using the first transmitter gain in the transmitter circuit comprises transmitting the first acoustic signal from a transducer coupled to the transmitter circuit.

3. The method of claim 2, wherein receiving the echo signal associated with the first acoustic signal using the first receiver gain in the receiver circuit comprises receiving the echo signal from the transducer, wherein the transducer is coupled to the receiver circuit.

4. The method of claim 2, wherein the transducer is coupled to a rotating portion of the downhole tool.

5. The method of claim 4, wherein the rotating portion comprises a rotating head positioned at a distal end of the downhole tool.

6. The method of claim 1, further comprising transmitting a second acoustic signal from the downhole tool and receiving at the downhole tool a second echo signal associated with the second acoustic signal using at least one of the adjusted transmitter gain and the adjusted receiver gain.

7. The method of claim 6, wherein
   transmitting the second acoustic signal from the downhole tool comprises transmitting the second acoustic signal at the same depth but a different azimuthal orientation than that of the first acoustic signal; and
   receiving at the downhole tool the second echo signal comprises receiving the second echo signal using the adjusted receiver gain.

8. The method of claim 6, wherein transmitting the second acoustic signal from the downhole tool comprises transmitting the second acoustic signal at a different depth but a different azimuthal orientation that the first acoustic signal using the adjusted transmitter gain.

9. The method of claim 1, wherein adjusting the receiver gain comprises using the following equation $$G_r(n) = \begin{cases} G_r(n-1), & 0.9A_{opt} < G_r(n-1) < 1.1A_{opt} \\ G_r(n-1) + \mu_r \log\left(\dfrac{A_{opt}}{\sum_{k=1}^{M} \alpha_r(n-k)}\right), & \text{otherwise} \end{cases}$$

where $G_r(n)$ corresponds to a receiver gain associated with an n-th previously received echo signal, $A_{opt}$ corresponds to an optimal level associated with an analog-to-digital converter of the tool, $\alpha_r(n)$ corresponds to an echo amplitude calculated for the n-th previously received echo signal; M corresponds to a predetermined number of previous received echo signals; $\mu_r$ comprises a constant step size that defines a convergence rate of an adjustment.

10. The method of claim 9, wherein M depends, at least in part, on one or more downhole conditions associated with the downhole tool.

11. A system, comprising
    a downhole tool;
    a transducer coupled to the downhole tool;
    a transmitter circuit coupled to the transducer and characterized by a transmitter gain;
    a receiver circuit coupled to the transducer and characterized by a receiver gain; and a controller communicably coupled to the transmitter circuit and the receiver circuit and configured to
cause the transmitter circuit to transmit a first acoustic signal from the transducer using the transmitter gain;
cause the receiver circuit to receive from the transducer a first echo signal associated with the first acoustic signal using the receiver gain; and
adjust the transmitter gain, at least in part, on the received first echo signal and at least one previously received echo signal; and
adjust the receiver gain based, at least in part, on an optimal level associated with an analog-to-digital convertor of the tool.

12. The system of claim 11, wherein the downhole tool comprises a rotating portion to which the transducer is coupled.

13. The system of claim 12, wherein the rotating portion comprises a rotating head positioned at a distal end of the downhole tool.

14. The system of claim 11, wherein the transducer comprises at least one of a piezoelectric element, a geophone, and an electromagnetic element.

15. The system of claim 11, wherein the downhole tool comprises one of a wireline tool and a logging-while-drilling tool.

16. The system of claim 11, wherein the controller is further configured to cause the transmitter circuit to transmit a second acoustic signal and the receiver circuit to receive a second echo signal associated with the second acoustic signal using at least one of the adjusted transmitter gain and the adjusted receiver gain.

17. The system of claim 16, wherein
the downhole tool comprises a rotating portion to which the transducer is coupled; and
the controller is further configured to
cause rotating portion of the downhole tool to alter the azimuthal orientation of the transducer before the second acoustic signal is transmitted; and
cause the receiver circuit to receive the second echo signal using the adjusted receiver gain.

18. The system of claim 11, wherein the controller is further configured to adjust the transmitter gain between depth changes of the downhole tool in a borehole.

19. The system of claim 11, wherein the controller is further configured to adjust the receiver gain using the following equation $$G_r(n) = \begin{cases} G_r(n-1), & 0.9A_{opt} < G_r(n-1) < 1.1A_{opt} \\ G_r(n-1) + \mu_r \log\left(\dfrac{A_{opt}}{\sum_{k=1}^{M} \alpha_r(n-k)}\right), & \text{otherwise} \end{cases}$$

where $G_r(n)$ corresponds to a receiver gain associated with an n-th previously received echo signal, $A_{opt}$ corresponds to an optimal level associated with an analog-to-digital converter of the tool, $\alpha_r(n)$ corresponds to an echo amplitude calculated for the n-th previously received echo signal; M corresponds to a predetermined number of previous received echo signals; and $\mu_r$ comprises a constant step size that defines a convergence rate of an adjustment.

20. The system of claim 19, wherein M depends, at least in part, on one or more downhole conditions associated with the downhole tool.

* * * * *